(12) United States Patent
Tate, Jr.

(10) Patent No.: US 8,527,121 B2
(45) Date of Patent: Sep. 3, 2013

(54) METHOD AND SYSTEM FOR CALCULATING AND DISPLAYING TRAVEL RANGE INFORMATION

(75) Inventor: Edward D. Tate, Jr., Grand Blanc, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 526 days.

(21) Appl. No.: 12/794,171

(22) Filed: Jun. 4, 2010

(65) Prior Publication Data
US 2011/0298640 A1  Dec. 8, 2011

(51) Int. Cl.
*G08G 1/123* (2006.01)
(52) U.S. Cl.
USPC ......... 701/22; 701/29.1; 701/29.3; 340/995.1
(58) Field of Classification Search
USPC ............ 701/29.3, 22, 45, 454, 99; 340/995.1
See application file for complete search history.

(56) References Cited

U.S. PATENT DOCUMENTS

| | | | | |
|---|---|---|---|---|
| 5,539,399 A * | 7/1996 | Takahira et al. | ......... | 340/995.27 |
| 5,734,099 A * | 3/1998 | Saigo et al. | ................. | 73/114.58 |
| 5,826,212 A * | 10/1998 | Nagai | ........................... | 701/454 |
| 6,625,539 B1 * | 9/2003 | Kittell et al. | ................. | 701/29.3 |
| 6,826,460 B2 * | 11/2004 | Kittell et al. | .................... | 701/22 |
| 6,879,962 B1 * | 4/2005 | Smith et al. | ..................... | 705/22 |
| 7,457,704 B2 * | 11/2008 | Yasuda et al. | .................. | 701/455 |
| 8,121,802 B2 * | 2/2012 | Grider et al. | .................... | 702/63 |
| 2006/0276937 A1 * | 12/2006 | Yamashita | .................... | 700/291 |
| 2010/0094496 A1 * | 4/2010 | Hershkovitz et al. | ........... | 701/22 |
| 2011/0082625 A1 * | 4/2011 | Miller et al. | ..................... | 701/45 |
| 2011/0288738 A1 * | 11/2011 | Donnelly et al. | ............... | 701/99 |
| 2011/0298640 A1 * | 12/2011 | Tate, Jr. | ...................... | 340/995.1 |
| 2012/0116606 A1 * | 5/2012 | Ichinokawa | ...................... | 701/1 |
| 2012/0179420 A1 * | 7/2012 | Gilman et al. | ................ | 702/165 |
| 2012/0191289 A1 * | 7/2012 | Guo et al. | .................... | 701/29.1 |

* cited by examiner

*Primary Examiner* — Thomas Black
*Assistant Examiner* — Wae Louie
(74) *Attorney, Agent, or Firm* — Christopher W. Quinn

(57) ABSTRACT

A display system for a vehicle includes a display screen and host machine operable for calculating a maximum theoretical range for a predetermined criterion, formulating a value function for each point in the maximum theoretical range, and calculating a solution to each of the value functions. The method also includes forming a polygon or a closed curve from the mathematical hull of all points in the maximum theoretical range having a value function solution less than corresponding limit, and displaying a perimeter of the closed curve via the display screen to indicate the effective range of the vehicle for the criterion. A vehicle includes an energy storage system, a motor/generator unit for propelling the vehicle in an electric-only (EV) mode, the display screen, and host machine, wherein the criterion is the EV mode. A method of operating the display system is also disclosed herein.

18 Claims, 2 Drawing Sheets

METHOD AND SYSTEM FOR CALCULATING AND DISPLAYING TRAVEL RANGE INFORMATION

TECHNICAL FIELD

The present invention relates to the calculation and display of information within a vehicle.

BACKGROUND

Vehicle navigation systems are networked computer devices which use global positioning data to accurately determine a position of the host vehicle. The host machine also calculates a recommended travel route using associated geospatial, topographical, and road network information, and then displays the recommended travel route on a display screen. A vehicle navigation system may also provide precise turn-by-turn driving directions to other locations of interest contained in a referenced mapping database.

Hybrid, battery electric, and extended-range electric vehicles have electric-only operating modes, also referred to as EV modes, in which the vehicle is propelled solely using electrical power. Navigation systems for such vehicles may also display "eco-route" information, i.e., a preferred travel route along a road network between an origin and a selected destination that tends to maximize the duration of travel in EV mode, thus minimizing fuel costs and tailpipe emissions.

SUMMARY

A vehicle display system and method are provided herein to calculate and communicate effective range information using a graphical map overlay. As used herein, the term "effective range information" refers to a vehicle's effective range of operation given a criterion such as EV mode in a battery-powered vehicle, e.g., a plug-in hybrid electric, extended-range electric, or battery electric vehicle, or for a particular gasoline consumption volume or cost in a conventional vehicle.

In a vehicle having a mapping system, a portion of a displayed map is automatically highlighted to clearly indicate the effective range of the vehicle from a predetermined location, e.g., a present location of the vehicle or a different reference location, and with respect to a predetermined criterion. In one embodiment, the criterion is EV mode, with an "electronic horizon" encompassing all feasible travel routes within a distance less than a remaining EV range minus a distance to a known refueling station. In a battery-powered vehicle, the refueling station is an electric recharging station, with the electronic horizon taking the form of a map overlay. The overlay graphically assists the driver in keeping within the effective EV range.

In particular, a vehicle display system as disclosed herein includes a display screen and a host machine. The host machine calculates a maximum theoretical range for a predetermined criterion, formulates a value function for each point in the maximum theoretical range, and calculates a solution to each of the value functions. Additionally, the host machine forms a closed curve or polygon from the mathematical hull of all points in the maximum theoretical range having a value function solution less than corresponding limit, and then displays at least the perimeter of the closed curve on the display screen as the overlay. In this manner, the overlay graphically indicates the effective range of the vehicle for the predetermined criterion with respect to the predetermined location.

The host machine receives basic range information such as a state of charge from an onboard controller or other suitable source, and solves a value function for each point in a predetermined region. Next, the host machine forms a closed curve or polygon from the mathematical hull of all points with a value function less than a corresponding time, distance, or energy limit, depending on the embodiment. The host machine then overlays at least the perimeter of the closed curve onto the display screen as a graphical map overlay. When used aboard a hybrid electric, battery electric, or extended range electric vehicle having an EV mode, the display system allows the planning of trips which stay within the EV range, e.g., by quickly illustrating the distance to various charging stations, and whether these stations are within the effective EV range.

A method of operating a display system for a vehicle includes using the host machine for calculating a maximum theoretical range for a predetermined criterion, such as EV mode, formulating a value function for each point in the maximum theoretical range, and calculating a solution to each of the value functions. The method further includes using the host machine for forming a closed curve or polygon from the mathematical hull of all points in the maximum theoretical range having a value function solution that is less than a corresponding limit, and displaying at least the perimeter of the closed curve via the display screen to thereby present the effective range of the vehicle for the predetermined criterion.

The above features and advantages and other features and advantages of the present invention are readily apparent from the following detailed description of the best modes for carrying out the invention when taken in connection with the accompanying drawings.

DESCRIPTION

Figure 1:
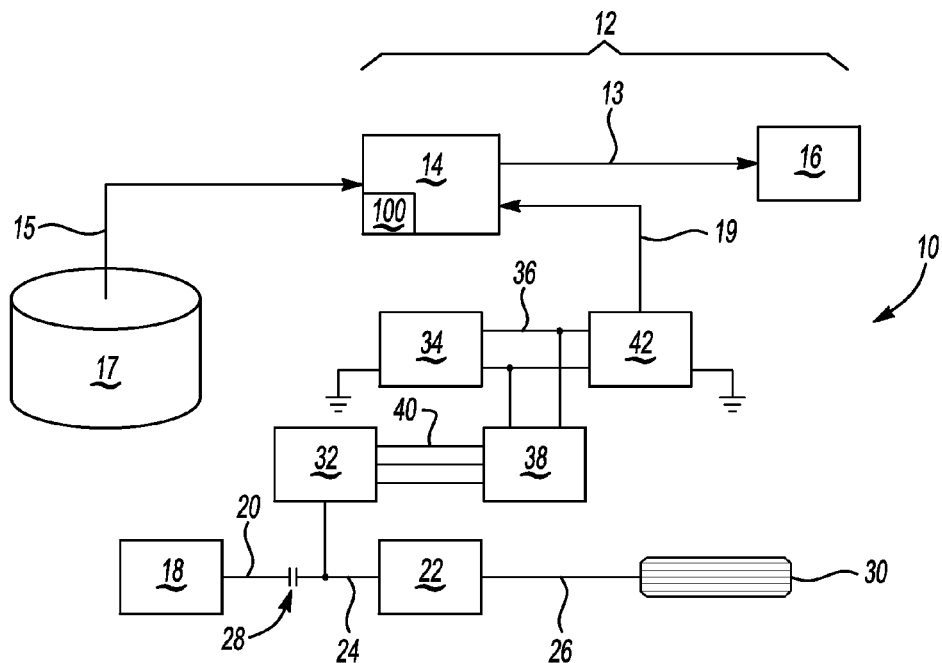
FIG. 1 is a schematic illustration of a navigation system as disclosed herein.

Referring to the drawings, wherein like reference numbers correspond to like or similar components throughout the several figures, a vehicle 10 is shown schematically in FIG. 1. Vehicle 10 includes a range display system 12 suitable for calculating and displaying range information to a user using a graphical overlay 13. Range information may include a range from a predetermined location, e.g., the present location of the vehicle 10, or a reference location such as home, office, or another location. The range information may be an electric-only or EV mode range from the predetermined location when the vehicle 10 is a battery electric vehicle (BEV), a hybrid electric vehicle (HEV), or an extended range electric vehicle (EREV). In another embodiment, range information may correspond to a particular gasoline volume or dollar amount when vehicle 10 is a conventional vehicle. Regardless of the configuration of vehicle 10, the overlay 13 depicts a zone or operating region where a driver might reasonably expect to reach, e.g., without depleting an electrical charge, fuel volume, or another criterion.

Range display system 12 includes a host machine 14 and a display screen 16. Host machine 14 selectively executes an algorithm 100 to calculate and display the overlay 13, as described in detail below with reference to FIGS. 2, 3, and 4. In some embodiments, host machine 14 may be configured as part of a vehicle navigation system, with the host machine in communication with a mapping database 17. When configured in such a manner, mapping database 17 provides geospatial and/or geocoded mapping data 15 to the host machine 14 to enable the host machine to calculate and display recommended travel routes on a map using the display screen 16. In other embodiments, the host machine 14 is a standalone system which works in conjunction with other elements of a vehicle navigation system, with the functionality of the host machine limited to the calculation and display of overlay 13.

Depending on the configuration, vehicle 10 may include an engine 18 having an output member 20, as well as a transmission 22 having an input member 24 and an output member 26. Output member 20 of engine 18 may be selectively connected to the input member 24 of transmission 22 via a clutch 28. Transmission 22 may be configured as an electrically variable transmission or any other suitable transmission capable of transmitting propulsive torque to a set of wheels 30 via the output member 26 to propel the vehicle 10.

Vehicle 10 may also include a high-voltage electric motor/generator unit (MGU) 32 or multiple MGUs depending on the vehicle design. MGU 32 may be configured as a multi-phase electric machine that is electrically connected to an energy storage system (ESS) 34 via a DC power bus 36, a power inverter module 38, and an AC power bus 40. ESS 34 has a state of charge that gradually or rapidly depletes depending on the manner the vehicle 10 is driven, including the terrain, distance, or traffic conditions of the route the vehicle travels. ESS 34 may be selectively recharged by an off-board source such as a recharging station, or by using the MGU 32 whenever the MGU is operating in its capacity as a generator, for example by capturing energy during a regenerative braking event in any vehicle so-equipped, or when the MGU is selectively powered by a small engine when the vehicle is configured as an EREV.

Vehicle 10 may also include an auxiliary power module (APM) 42, e.g., a DC-DC power converter, which is electrically connected to ESS 34 via the DC power bus 36. APM 42 may be electrically connected to an auxiliary battery (not shown), e.g., a 12-volt DC battery, and adapted for energizing auxiliary systems aboard the vehicle 10. APM 42 or any other suitable onboard controller provides range data 19 to host machine 14, which is processed by the host machine in conjunction with the mapping data 15 to generate the overlay 13 as described below.

Still referring to FIG. 1, the host machine 14 may be configured as a single or a distributed digital computer generally comprising a microprocessor or central processing unit, read only memory (ROM), random access memory (RAM), electrically-erasable programmable read only memory (EEPROM), a high-speed clock, analog-to-digital (A/D) and digital-to-analog (D/A) circuitry, and input/output circuitry and devices (I/O), as well as appropriate signal conditioning and buffer circuitry.

With respect to the range display system 12, this device is operable for calculating a remaining effective EV range or other desired range, and for graphically communicating the calculated range as the graphical overlay 13. Overlay 13 is displayed on display screen 16 as highlighting or a transparent color layer demarcating the perimeter or boundaries of a calculated effective range, i.e., a range that modifies a maximum theoretical range using geospatial data as set forth below.

For example, execution of algorithm 100 aboard a vehicle configured as a BEV, EREV, or HEV can generate and display overlay 13 to encompass all possible travel routes having a distance less than a remaining EV range, minus a distance to a known charging station. This driving area is graphically overlaid by host machine 14 onto a map presented via the display screen 16 in order to illustrate the effective range of vehicle 10 in EV mode, such as before the vehicle fully depletes its remaining electrical charge. Other range criteria may be used for conventional vehicles, such as overlaying a range of the vehicle with respect to a specified amount or cost of gasoline.

Range data 19 can be provided to host machine 14 from the APM 42, from another onboard controller, or from an embedded navigation system as noted above. Range data 19 may take into consideration the state of charge of ESS 34 in order to determine a theoretical maximum EV range. However, state of charge and known or estimated electrical consumption rates do not consider the associated energy costs of traveling available routes to a specified destination.

Therefore, host machine 14 solves a value function equation as set forth below which summarizes the minimum energy or distance along the road network to arrive at a select subset of points in a map with respect to the vehicle's current location. This value function can be found using linear programming, value iteration, or other suitable techniques, including approximation techniques suitable for finding an approximate value function. The value function is solved for energy or distance costs on the map. A level set may be estimated in the points in the value function.

Estimation can be done via tessellation, i.e., by generating a collection of plane figures that fill a plane with no overlaps or gaps, and by finding a level set in the tessellation. This tesselation may be used with an interpolation method such as barycentric interpolation to estimate the value function for locations which are not explicitly solved for in the value function. Therefore, the term "value function" as used herein may include an approximate value function. By finding a level set, which is the points in the value function equal to a specific value, one may find a closed curves or polygon which defines the reachable range of the vehicle 10.

This level set form one or more polygons, the perimeters of which are overlaid as a solution onto the display screen 16 as the graphical overlay 13. Display screen 16 may be any device capable of displaying a map to a user. For example, display screen 16 can display travel route information using a graphical route/map trace once a user records route origin and destination. Using a best case range prediction, host machine 14 selectively executes the algorithm 100 of FIG. 2 to calculate the time, distance, or energy cost for all destination points located in a particular region, e.g., in a circle defining the maximum theoretical EV range.

Host machine 14 can accomplish this by solving for a value function of each point in the specified region. A closed curve or a polygon is automatically formed from the mathematical hull of all points with a value function less than a corresponding threshold. The perimeter of the closed curve is then overlaid as at least part of the overlay 13 on the display screen 16, for example as a transparent color zone indicating at a glance the remaining EV range of vehicle 10 from a predetermined location.

Figure 2:
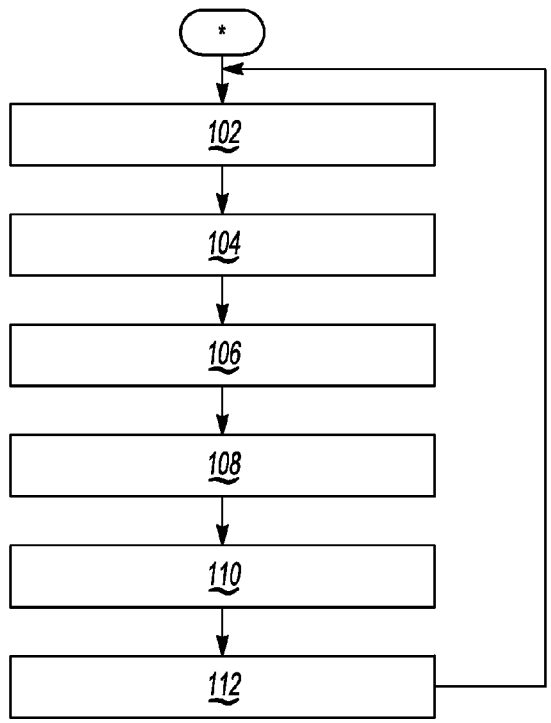
FIG. 2 is a flow chart describing an algorithm usable with the navigation system of FIG. 1.

Referring to FIG. 2, after initiation (*), e.g., upon selection of the display option by a user or start up of a vehicle navigation system, algorithm 100 proceeds to step 102, wherein the host machine 14 calculates or otherwise determines the maximum theoretical range of the vehicle 10 with respect to a particular criterion. For example, host machine 14 may use range data 19 from an onboard controller, state of charge of the ESS 34, energy consumption rate of the MGU 32, and/or other values to determine the maximum theoretical range. The algorithm 100 then proceeds to step 104.

At step 104, host machine 14 uses the mapping data 15 from mapping database 17 to collect all road points in a region which contain the maximum theoretical range from step 102. The region for calculation of the value function may be selected based on display characteristics or points of interest. Step 104 produces the set $(S_{all})=\{(x, y)\}$ in a road network in a circle of maximum Euclidean distance, i.e., a set of all points on a map that the vehicle 10 can conceivably reach given the criterion of step 102, with point set (x, y) describing the coordinates of a reference point on the map. Host machine 14 uses the current position of vehicle 10 or a different reference position, e.g., a home, office, restaurant, or other location of interest, as the reference point, i.e., reference point 52 of FIGS. 3 and 4. The algorithm 100 then proceeds to step 106.

At step 106, host machine 14 formulates a dynamic programming equation to determine a minimum energy or distance required to travel from each point in the maximum theoretical range to the current (x, y) position of vehicle 10. The value V(x, y), may be used as an estimate of the total cost to reach a given point (x, y) in the set $(S_{all})$. This total cost to reach a point is also referred to as the "cost-to-go", as it refers to the cost to go and reach a specific point in the map. The value function or cost-to-go may be formulated as follows:

$$V(x,y)=\min_{next(x,y)}\{c((x,y),next(x,y))+V(next(x,y))\}.$$

In this equation c(x, y) is the costs of travel per the specified criteria for each road segment considered. Since it is impractical to sample the full set of points which represent the road network, a sampled set of points is used. This sampled set of points consists of points in the road network sufficient to determine a best travel route. The sampling may include one or more points per road segment. Some roads have no points represented in the sampling.

Figure 3:
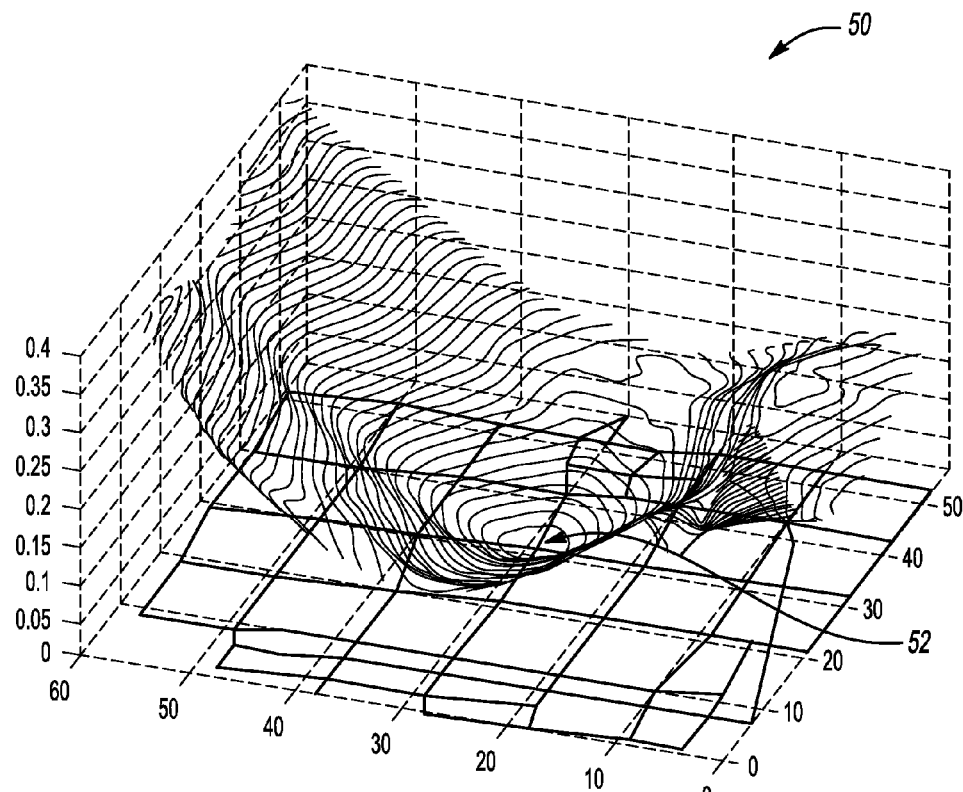
FIG. 3 is a schematic illustration of expected energy requirements to travel a particular road network.

The expression next(x, y) refers to the next destination reachable from the current position (x, y) evaluated in the value function. This equation can be solved using any number of approaches documented in literature on dynamic programming such as but not limited to value iteration, policy iteration, and dynamic programming. Furthermore, approximate solutions to this equation can be found using approximation methods such as approximate linear programming, where a linear basis and weights are used to approximate the value function. Referring briefly to FIG. 3, this set may be represented as a contour diagram 50. The current position (x, y) of the vehicle 10 is represented as point 52. The cost to reach point 52 from any point can be determined by the various contour lines forming the contour diagram 50. Algorithm 100 then proceeds to step 108.

At step 108, host machine 14 solves the value function V(x, y) formulated in step 106 using a linear programming or other suitable technique, and to thereby determine a feasible set $(S_{feasible})$ of points. For example, the following formula may be used:

$$S_{feasible}=\{(x,y)|(x,y)\in S_{all}, V(x,y)<V_{max}\}.$$

At step 110, a perimeter of the feasible range set is calculated. For example, a Voronoi diagram may be created by host machine 14 using all points in the range circle of step 104, and to construct a perimeter from the mathematical hull of Voronoi cells in the feasible data set $(S_{feasible})$ as determined in step 108. As understood in the art, a Voronoi diagram partitions a plane with points into convex polygons such that each polygon contains exactly one generating point, with every point in a given polygon closer to its generating point than to any other. The polygon cells may be referred to as Voronoi cells, and the host machine 14 constructs the overlay 13 using the perimeter of the Voronoi cells. Alternately, host machine 14 may build a closed curve or polygon based on a level set of V(x,y) equal to range or energy. The algorithm 100 then proceeds to step 112.

Figure 4:
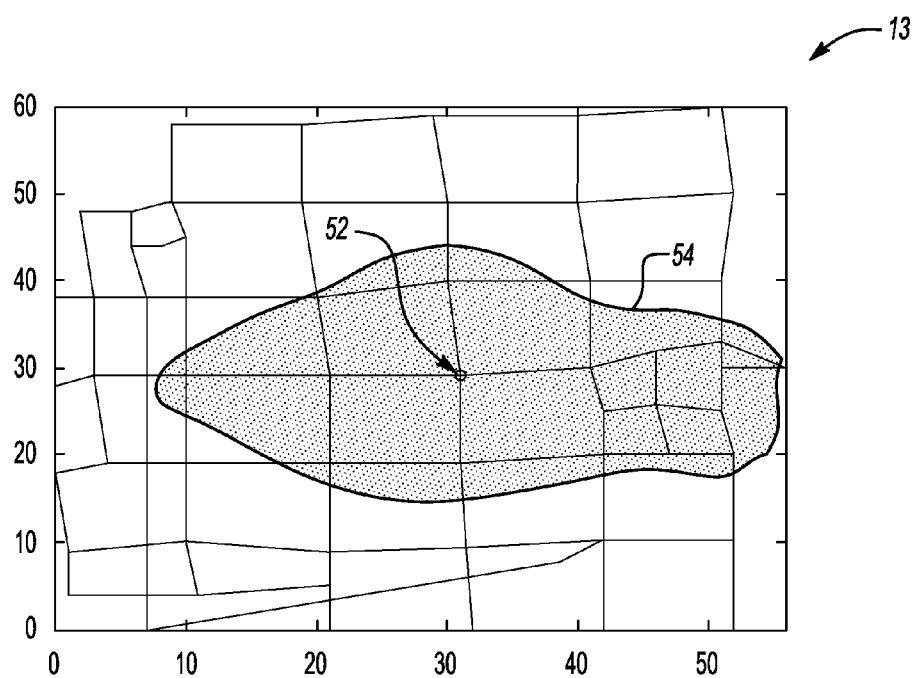
FIG. 4 is a schematic illustration of displayed range information.

At step 112, host machine 14 overlays at least the perimeter of the closed curve or polygon determined at step 110 onto the display screen 16 as the overlay 13, or more precisely onto an image of a map containing navigational data that is displayed thereon. Referring briefly to FIG. 4, point 52, e.g., a current position of vehicle 10 or a position of a different reference location, is enclosed within a range perimeter 54 defining the area of overlay 13. In one embodiment, the vehicle 10 of FIG. 1 is battery powered, and the area defined by range perimeter 54 may symbolize an environmentally friendly/zero emissions range of EV travel.

As set forth in detail above, dynamic programming and value functions may be used by the range display system 12 shown in FIG. 1 to determine a least cost path from each point in a maximum theoretical range to the vehicle 10, with linear programming used to quickly solve the value function. Voronoi diagrams or other suitable approaches may be used to ultimately construct range perimeter 54 as shown in FIG. 4. An energy cost function is thus used in lieu of geometric distance in calculating an effective electric or other predetermined driving horizon to a user of the vehicle 10.

An alternative method for generating the overlay 13 is to solve a set of routes in the region of interest. The origin of each route is the current location of the vehicle 10, and the destination is one point in a region of interest. When solving for the route, all information on the costs to follow the route to each point along the route are preserved. The cost information along these routes approximates a value function. With this approximation of a value function, the techniques are applied as previously described for generating the polygon or overlay 13.

While the best modes for carrying out the invention have been described in detail, those familiar with the art to which this invention relates will recognize various alternative designs and embodiments for practicing the invention within the scope of the appended claims.

The invention claimed is:
1. A display system for a vehicle, the display system comprising:
   a display screen; and
   host machine in communication with the display screen and a geospatial mapping database, wherein the geospatial mapping database provides a map of road segments, the host machine being operable for:
      determining the current position of the vehicle;
      calculating a maximum theoretical range for the vehicle using a predetermined criterion;
      formulating a value function via a dynamic programming equation which calculates the minimum cost to travel from each of a set of sampled points on the map, within one of the maximum theoretical range and a displayable subset of the maximum theoretical range, to the current position of the vehicle;

calculating a solution to the value function, for each point in the set of sampled points, using a cost which is a function of attributes of each road segment appearing on the map;

forming a feasible range set as a closed curve from the mathematical hull of all points in the maximum theoretical range having a value function solution that is less than a corresponding limit; and displaying the feasible range set as at least a perimeter of the closed curve via the display screen to thereby indicate the effective range of the vehicle for the predetermined criterion with respect to the current position of the vehicle.

2. The display system of claim 1, wherein the vehicle is powered exclusively by electrical power at least part of the time, and wherein the predetermined criterion is an electric-only (EV) propulsion mode, such that the perimeter is a graphical overlay which graphically indicates the effective EV range from the predetermined location with respect to the map.

3. The display system of claim 1, wherein the cost is at least one of: time, energy, distance, and an arbitrary function of the attributes of a given one of the road segments.

4. The display system of claim 3, wherein the cost includes the arbitrary function of the attributes, and wherein the attributes include at least one of: posted speed, historical speed, road geometry, road grade, and traffic control devices on the given one of the road segments.

5. The display system of claim 1, wherein the value function is calculated with respect to a position of a charging station with respect to the predetermined location.

6. The display system of claim 1, wherein the host machine uses a Voronoi diagram to define a perimeter of the closed curve.

7. The display system of claim 1, wherein the host machine calculates a solution to each of the value functions using one of an approximation method and a fixed point iterative algorithm.

8. A vehicle comprising:
an energy storage system;
a motor/generator unit which is electrically connected to the energy storage system and adapted for generating torque for propelling the vehicle in an electric-only (EV) mode;
a display screen; and
host machine in communication with a geospatial mapping database, wherein the geospatial mapping database provides a map of road segments, the host machine being operable for:
determining the current position of the vehicle;
calculating a maximum theoretical range for the EV mode with respect to the current position of the vehicle;
formulating a value function via a dynamic programming equation which calculates the minimum cost to travel from each of a set of sampled points on the map to the current position of the vehicle within one of the maximum theoretical range and a displayable subset of the maximum theoretical range;
calculating a solution to the value function for each point in the set of sampled points using a cost which is a function of the attributes of each road segment appearing on the map;
forming a feasible range set as a closed curve from the mathematical hull of all points in the maximum theoretical range having a value function solution less than a corresponding limit; and
displaying the feasible range set as at least a perimeter of the closed curve via the display screen to thereby indicate the effective EV range of the vehicle with respect to the current position of the vehicle.

9. The vehicle of claim 8, wherein the host machine processes information from a geospatial mapping database and presents a map via the display screen, and wherein the perimeter of the closed curve is a graphical overlay to the map.

10. The vehicle of claim 8, wherein the cost is at least one of: time, energy, distance, and arbitrary function of the attributes of a given one of the road segments.

11. The vehicle of claim 10, wherein the cost includes the arbitrary function of the attributes, and wherein the attributes include at least one of: a posted speed, an historical speed, road geometry, road grade, and traffic control device usage on the given one of the road segments.

12. The vehicle of claim 8, wherein the host machine uses a Voronoi diagram to define a perimeter of the closed curve.

13. A method of operating a display system for a vehicle, the display system having a display screen and a host machine which is in communication with a geospatial mapping database that provides a map of road segments, the method comprising:
determining the current position of the vehicle;
formulating a value function via a dynamic programming equation which calculates the minimum cost to travel from each of a set of sampled points on the map to the current position of the vehicle within one of the maximum theoretical range and a displayable subset of the maximum theoretical range;
calculating a solution to the value function for each point in the set of sampled points using a cost which is a function of the attributes of each road segment appearing on the map;
forming a feasible range set as a closed curve from the mathematical hull of all points in the maximum theoretical range having a value function solution less than a corresponding limit; and
displaying the feasible range set as at least a perimeter of the closed curve via the display screen to thereby indicate the effective EV range of the vehicle with respect to the current position of the vehicle.

14. The method of claim 13, wherein calculating a solution to the value function for each point using a cost includes using at least one of: time, energy, distance, and an arbitrary function of the attributes of a given one of the road segments.

15. The method of claim 14, including the arbitrary function, wherein the attributes include at least one of: a posted speed, an historical speed, road geometry, road grade, and traffic control device usage on the given one of the road segments.

16. The method of claim 13, further comprising calculating the value function with respect to a position of a charging station.

17. The method of claim 13, further comprising defining the perimeter of the closed curve using a Voronoi diagram.

18. The method of claim 13, wherein calculating a solution to each of the value functions includes using one of an approximation method and a fixed point algorithm.

* * * * *